Patented Sept. 8, 1936

2,053,785

UNITED STATES PATENT OFFICE 2,053,785

ANTIOXIDANTS

Waldo L. Semon, Silver Lake Village, Ohio, assignor to The B. F. Goodrich Company, New York, N. Y., a corporation of New York No Drawing. Application June 2, 1933,
Serial No. 674,042

8 Claims. (Cl. 18—50)

This invention relates to the art of preserving rubber, synthetic plastics, fatty oils, petroleum products, and like organic materials against unduly rapid deterioration due to oxidation and the like.

This invention, in brief, consists in treating the rubber or other like organic material with a member of a class of compounds which may be designated as nuclear hydrocarbon substituted diaryl p-phenylene diamines. They have the general structural formula $$R_1-NH-R_2-NH-R_3$$

wherein $R_1$ and $R_3$ are aromatic nuclei, $R_2$ is a para phenylene group, and at least one of the groups $R_1$, $R_2$ and $R_3$ contains a hydrocarbon substituent and preferably an alkyl substituent.

For example, the following compounds are typical members of the class of anti-oxidants described above: 2,5 dianilino toluene; 2,5 di(p-tolylamino)toluene; 2,5 di(alpha-naphthylamino) toluene; 2,5 di(beta-naphthylamino) toluene; 2,5 dianilino cumene; 1,4 dianilino 2,6 xylene; 2,5 dianilino biphenyl; 2,5 di(naphthylamino) biphenyl; 2,5 dianilino cyclohexyl benzene; o-ditolyl p-phenylene diamine; m-ditolyl p-phenylene diamine; p-ditolyl p-phenylene diamine; di-xylyl p-phenylene diamine; etc. Any of the above-enumerated compounds may be used with good effect to retard the deterioration of rubber or other like organic substances, preferably in moderately small proportions, say from 0.1 to 5 per cent.

As a specific example of one embodiment of the invention of this application, a rubber composition is prepared containing blended plantation rubber 100 parts by weight, sulphur 5.5 parts, zinc oxide 30 parts, gas black 40 parts, mineral rubber 10 parts, palm oil 5 parts, and hexamethylene tetramine 0.75 part. One portion of this composition is used as a control, while another portion is further mixed with 0.96 part by weight (0.5% of the composition) of 2,5 dianilino toluene. After vulcanization in a press for 45 minutes at 294° F. to produce an optimum cure, it is found that the composition containing the anti-oxidant deteriorates only approximately half as fast as the control composition when subjected to an accelerated aging test such as the Geer oven test.

It is to be understood that the term "treating" is employed in the appended claims in a generic sense to include either the incorporation of the anti-oxidants into the rubber or the like by mixing them into the said material while it is in a plastic or fluid condition, or by applying them to the surface of a solid mass thereof as a paste, powder or solution. The term "rubber" is likewise employed in the claims in a generic sense to include caoutchouc, both natural and synthetic, balata, gutta-percha, rubber isomers, and like products, whether or not admixed with fillers, pigments, or vulcanizing or accelerating agents.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed without departing from the spirit and scope of the invention as defined in the appended claims.

This application is a continuation in part of my co-pending application Serial No. 281,585 filed May 29, 1928, now Patent No. 1,940,815.

I claim:
1. The method of preserving rubber which comprises treating rubber with a substance having the general formula

$$R_1-NH-R_2-NH-R_3$$

wherein $R_1$ and $R_3$ are benzene nuclei, at least one of which contains an alkyl substituent, but which contain no other substituents, and $R_2$ is a para-phenylene group.

2. The method of preserving rubber which comprises treating rubber with p-ditolyl p-phenylene diamine.

3. A composition comprising rubber and a substance having the general formula $$R_1-NH-R_2-NH-R_3$$

wherein $R_1$ and $R_3$ are benzene nuclei, at least one of which contains an alkyl substituent, but which contain no other substituents, and $R_2$ is a para-phenylene group.

4. A composition comprising rubber and p-ditolyl p-phenylene diamine.

5. The method of preserving rubber which comprises treating rubber with a substance having the general formula $$R_1-NH-R_2-NH-R_3$$

wherein $R_1$ and $R_3$ are alkyl-phenyl groups, and $R_2$ is a para-phenylene group.

6. A rubber composition comprising rubber and a substance having the general formula $$R_1-NH-R_2-NH-R_3$$

wherein $R_1$ and $R_3$ are alkyl-phenyl groups, and $R_2$ is a para-phenylene group.

7. The method of preserving rubber which comprises treating rubber with ditolyl p-phenylene diamine.

8. A composition comprising rubber and ditolyl p-phenylene diamine.

WALDO L. SEMON.